(12) United States Patent
Yang et al.

(10) Patent No.: US 6,831,778 B2
(45) Date of Patent: Dec. 14, 2004

(54) HYBRID COMPONENT AND METHOD FOR COMBINING TWO PUMPING LIGHTS AND DEPOLARIZING THEM SIMULTANEOUSLY AND OPTICAL AMPLIFIER THEREFOR

(75) Inventors: Taotao Yang, Wuhan (CN); Xinda Yin, Wuhan (CN); Yong Luo, Wuhan (CN)

(73) Assignee: Wuhan Research I.O.P. and Telecom, Hubei Province (CN)

( * ) Notice: Subject to any disclaimer, the term of this patent is extended or adjusted under 35 U.S.C. 154(b) by 64 days.

(21) Appl. No.: 10/322,621

(22) Filed: Dec. 19, 2002

(65) Prior Publication Data

US 2003/0133180 A1 Jul. 17, 2003

(30) Foreign Application Priority Data

Dec. 26, 2001 (CN) .......................................... 01138352 A
Dec. 26, 2001 (CN) .......................................... 01273529 U

(51) Int. Cl.[7] ................................................. H01S 3/00
(52) U.S. Cl. ..................................... 359/341.3; 359/334
(58) Field of Search .............................. 359/334, 341.3; 385/11

(56) References Cited

U.S. PATENT DOCUMENTS

| | | |
|---|---|---|
| 5,508,992 A | 4/1996 | Hirose et al. |
| 5,517,022 A | 5/1996 | Bock et al. |
| 5,812,583 A | 9/1998 | Petersen |
| 5,999,544 A | 12/1999 | Petersen |
| 6,404,542 B1 * | 6/2002 | Ziari et al. ............... 359/341.3 |
| 6,522,796 B1 * | 2/2003 | Ziari et al. ................... 385/11 |

FOREIGN PATENT DOCUMENTS

| | | |
|---|---|---|
| CN | 1285663 A | 2/2001 |
| EP | 0 859 359 A1 | 8/1998 |
| JP | 11-73699 A | 3/1999 |

* cited by examiner

*Primary Examiner*—Mark Hellner
(74) *Attorney, Agent, or Firm*—Sughrue Mion, PLLC

(57) ABSTRACT

The present invention relates to a hybrid component and method capable of simultaneously combining and depolarizing two pump laser diodes of different wavelengths with linear polarized output. The beam combiner is a Wellstone prism which is used to combine two linear-polarized pumping beams, and the depolarizer has three different embodiments: a single stage high birefringent waveplate; two stages high birefringent waveplates; a quarter waveplate or a three-quarter waveplate plus a single stage high birefringent waveplate. The Polarization Beam Combiner (PBC) and the depolarizer are integrated into one single hybrid component, in which two orthogonal pumping lights with different wavelengths are combined and depolarized simultaneously. Therefore, the hybrid component and method makes it simpler and cheaper to design a Raman amplifier and will propel Raman amplifier market penetration in optical communication systems.

19 Claims, 5 Drawing Sheets

HYBRID COMPONENT AND METHOD FOR COMBINING TWO PUMPING LIGHTS AND DEPOLARIZING THEM SIMULTANEOUSLY AND OPTICAL AMPLIFIER THEREFOR

FIELD OF INVENTION

The present invention relates to optical combining and depolarizing technology, and in particular, relates to a hybrid component and method capable of simultaneously combining and depolarizing pumping lights from two pump laser diodes with different wavelengths and optical amplifiers utilizing the same.

BACKGROUND ART

Recently, polarization beam combiner and depolarizer have attracted a lot of attention because of their promising applications in Raman amplifiers. For a Raman amplifier, the amplification is not transition among energy levels, but stimulated Raman scattering. It is common knowledge that stimulated Raman scattering is highly dependent on the polarization relationship between pumping light and signals. In Raman amplification, only the signals matched with the polarization of pump light can be amplified. In other words, when the polarization orientations of the signal lights and the pumping light are vertical to each other, the signal lights can not be amplified at all; while the polarization orientations of the two are parallel, the signal lights can be amplified to a maximum level; and the amplification for other polarization relationships is between those for the above two cases. This unique amplification mechanism leads to polarization dependent gain (PDG) for the signals lights.

A semiconductor pump laser of Fabry-Perot type with wavelength stabilized by a fiber Bragg grating (FBG) has a wide spectrum width. Therefore, stimulated Brillouin scattering can be depressed effectively when the pumping laser yields several hundreds of miliwatts. Usually, the pumping light is linear-polarized output. When the gain medium is not polarization-maintaining fiber, the Raman gain will vary due to the variation of the relative state of polarization of the signal and the pumping light. In practical applications of distributed Raman amplifiers, the gain medium is the transmission fiber, for example, STM-28, which is nearly an ideally cylindrical wave guide, of which the depolarizing capability is too weak to meet the market demand. Especially for a co-pumped scheme, the PDG may be greater than 0.5 dB when the Raman gain is around 10 dB.

There are two conventional arts to achieve a depolarized pumping source as following.

To obtain a stable gain for a signal of all polarizations, people usually use two linear-polarized pumping lights combined by a polarization beam combiner (PBC) to reduce PDG, of which the polarization orientations are orthogonal. However, if the two pumping lights have significantly different spectra, the PBC can not depolarize them effectively any more. Moreover, this depolarizing approach doubles the number of pumping laser diodes for each pumping wavelength, and increase cost significantly.

A depolarized pumping light can also realized by combining two pumping laser diodes of different wavelengths using a polarization beam combiner with polarization-maintaining fiber output, and then depolarizing the combined light by a depolarizer with a polarization-maintaining fiber input. This scheme adopts a discrete polarization beam combiner (PBC) and a discrete depolarizer, resulting in greater insertion loss (1.2 dB or more), bulk size and more cost.

Some prior art documents such as U.S. Pat. Nos. 5,812,583(1998.9.22) and 5,999,544(1999.12.7) disclose that two prisms are used for depolarizing, but not integrated with another part for polarization beam combining.

Therefore it is necessary to find out an effective method to reduce PDG with low cost.

SUMMARY OF INVENTION

The present invention aims to provide a hybrid component and method capable of combining and depolarizing two different wavelength pumping beams with compact size, and low insertion loss, as well the optical amplifier thereof.

The present invention provides a hybrid component for combining and depolarizing pumping lights comprising: an input means for inputting two linear polarized pumping lights; a polarization beam combiner for combining said two linear polarized pumping lights to form a combined beam; a depolarizer for depolarizing the combined beam; and an output means for collecting and outputting a single combined and depolarized pumping beam. Said input means includes a dual polarization-maintaining core collimator, said polarization beam combiner includes a Wellstone prism consisting of two wedge prisms with orthogonal optical axis, and said outputting means includes a single core collimator.

The present invention further provides an optical amplifier including the hybrid component for combining and depolarizing pumping lights as defined above.

The present invention further provides a method for combining and depolarizing pumping lights in an optical amplifier comprising the steps of: inputting two polarized pumping lights; combining said two polarized pumping lights to form a combined beam; depolarizing the combined beam; collecting and outputting a single combined and depolarized pumping beam. Said combining step and depolarizing step combine and depolarize the two pumping lights simultaneously.

According to the invention, a Polarization Beam Combiner (PBC) and a depolarizer are integrated into one single hybrid component, in which two pumping lights of different wavelengths and orthogonal polarization orientations are combined and depolarized simultaneously.

With the hybrid component of the present invention, the number of the pumping laser diodes can be reduced by half compared to the first conventional art. And the size of the component and insertion loss can also be decreased greatly compared to utilize discrete components.

BRIEF DISCRIPTION OF THE DRAWINGS

DETAILED DESCRIPTION OF THE INVENTION

Figure 1:
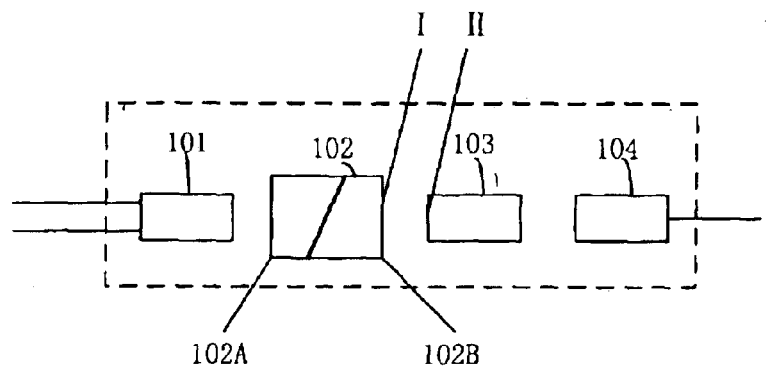
FIG. 1 illustrates the arrangement of the hybrid component according to one embodiment of the invention.

FIG. 1 shows the arrangement of the hybrid component according to one embodiment of the present invention. As shown in FIG. 1, the hybrid component consists of four parts: a dual core collimator as input part 101 for inputting two linear-polarized pumping lights; a polarization beam combiner 102 for combining the two pumping lights; a depolarizer 103 for depolarizing the combined beam; a single core collimator as output part 104 for outputting the combined and depolarized pumping beam. I represents the output plane of the polarization beam combiner 102 and II represents the incident plane of the depolarizer 103.

Figure 2:
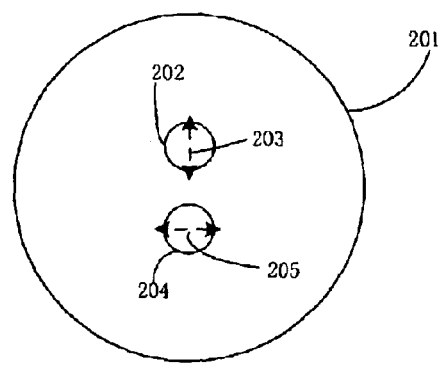
FIG. 2 shows the diagrammatic sketch of a dual PM core collimator's terminal face according to the embodiment of the invention.

According to the embodiment of the invention, the input part 101 is a dual polarization-maintaining core collimator, and FIG. 2 is the diagrammatic sketch of the dual PM core collimator's terminal face. As shown in FIG. 2, 201 is the terminal face of the collimator, and 202, 204 are the two PM fibers. The slow axes (203, 205) of the two polarization-maintaining fiber cores are orthogonal to each other.

Figure 3:
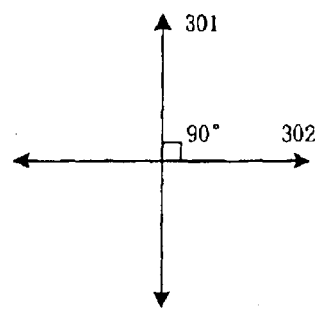
FIG. 3 shows the included angle between the optical axes of the two wedge prisms to form a Wellstone prism according to one embodiment of the invention.

According to the embodiment of the invention, the beam combiner is a Wellstone prism 102 which consists of two wedge prisms, 102A and 102B as shown in FIG. 1. The Wellstone prism 102 can combine the two linear-polarized pumping lights coming from the dual PM core collimator. The optical axes of the two wedge prisms 102A and 102B are orthogonal to each other as shown in FIG. 3.

Figure 4A:
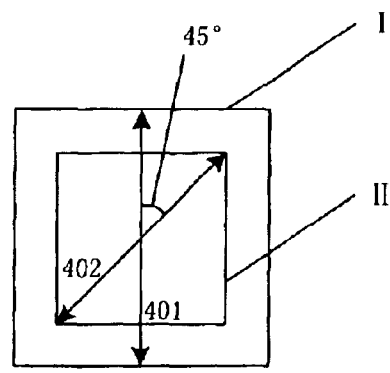
FIG. 4A shows the included angle between the optical axes of the second wedge prism and the depolarizer according to the embodiment of the invention.

FIG. 4A shows the included angle between the optical axis 401 of wedge prism 102B and the optical axis 402 of the depolarizer 103. As shown in FIG. 4A, the included angle between the optical axes of wedge prism 102B and the depolarizer 103 is set to 45°. Although the included angle can be set at other angles, 45° or close to 45° is preferred.

Figure 4B:
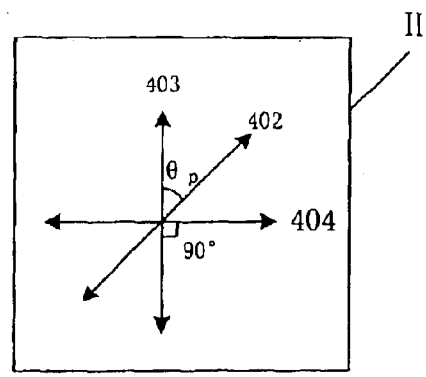
FIG. 4B shows the polarization relationship between the two combined pumping light and the depolarizer.

FIG. 4B shows the polarization relationship between the two combined pumping light and the depolarizer. As shown in FIG. 4B, 403 and 404 are the polarization orientations of the two pumping lights. 403 and 404 are orthogonal to each other in theory, but in practice, the included angle between 403 and 404 may slightly deviate from 90°.

Figure 5:
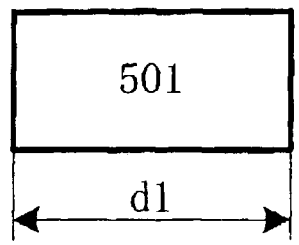
FIG. 5 is the first embodiment of the depolarizer according to the invention.
Figure 6A:
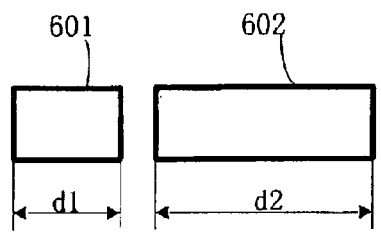
FIG. 6A is the second embodiment of the depolarizer according to the invention.
Figure 7A:
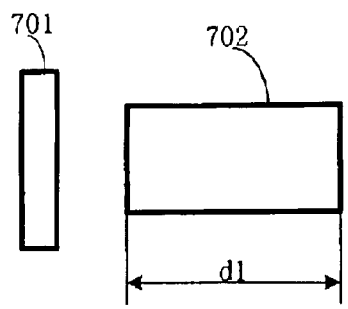
FIG. 7A is the third embodiment of the depolarizer according to the invention.

According to the present invention, the depolarizer 103 has several embodiments: a single stage high birefringent waveplate 501, as shown in FIG. 5; two stage high birefringent waveplates (601,602), as shown in FIG. 6A; a quarter waveplate or a three-quarter waveplate 701 plus a single stage high birefringent waveplate 702, as shown in FIG. 7A.

In the first embodiment of the depolarizer, a high birefringent waveplate 501 with a length of d1 is used, where d1 is determined by the spectrum profile of the pumping light and refractive index difference of the depolarizer, as shown in FIG. 5.

FIG. 6A shows the second embodiment of the depolarizer. As shown in FIG. 6A, two high birefringent waveplates with lengths of d1 and d2 are used, of which the included angle between the axes of the two waveplates is set to 45° or close to 45°. If both the waveplates are made from the same material, the lengths relationship between the two high birefringent waveplates should be $d2 \geq 2d1$ or $d1 \geq 2d2$. When there is $d2=2d1$ or $d1=2d2$, the two waveplates make up of a Lyot depolarizer.

Jones matrix is used to analyze the structure of the two stage depolarizer of the second embodiment. And by utilizing concepts of coherence matrix and coherence function, it can be found that the degree of polarization (DOP) of the output light is to the minimum when the lengths of the two depolarizing waveplates satisfy the following equations (1):

$$\begin{cases} \frac{2\pi |n_o - n_e| \Delta\lambda}{\lambda_0^2} d_1 \geq \alpha \\ \frac{2\pi |n_o - n_e| \Delta\lambda}{\lambda_0^2} d_2 \geq \alpha \\ \frac{2\pi |n_o - n_e| \Delta\lambda}{\lambda_0^2} (d_1 + d_2) \geq \alpha \\ \frac{2\pi |n_o - n_e| \Delta\lambda}{\lambda_0^2} (d_2 - d_1) \geq \alpha \end{cases} \quad (1)$$

where $\Delta\lambda$ is the root mean squared (RMS) spectrum width of the pumping light, $\lambda_0$ is the center wavelength of the pumping light, $|n_o-n_e|$ is the refractive index difference between fast axis light and slow axis light, $\alpha$ is determined by the spectrum type of the pumping light. For a Lorentz spectrum, when there is $\alpha=6.9$, the coherence function equals to 0.001. The degree of polarization satisfying equations (1) can be simplified as:

$$DOP=|\cos(2\theta)\cos(2\theta p)| \quad (2)$$

Figure 6B:
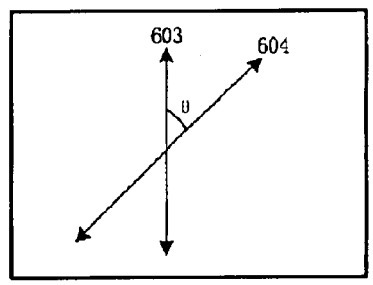
FIG. 6B shows the included angle between the optical axes of the two stage high birefringent waveplate according to the second embodiment of the depolarizer.

In the second embodiment of the depolarizer, θp is the included angle between the polarization orientation of the pumping light and the optical axis of the first waveplate, as shown in FIG. 4B. And θ is the included angle between the optical axes of the two depolarizing waveplates, as shown in FIG. 6B. In FIG. 6B, 603 is the optical axis of the first waveplate 601 and 604 is the optical axis of the second waveplate 602. It can be seen that when θ or θp is set to 45°, DOP equals to 0.

Likewise, for the one stage depolarizer of the above first embodiment, the length of the waveplate d1 can be calculated from equation (3) as follows:

$$\frac{2\pi |n_o - n_e| \Delta\lambda}{\lambda_0^2} d_1 \geq \alpha \quad (3)$$

At this time, DOP of the output light can be expressed as:

$$DOP=|\cos(2\theta p)| \quad (4)$$

Figure 7B:
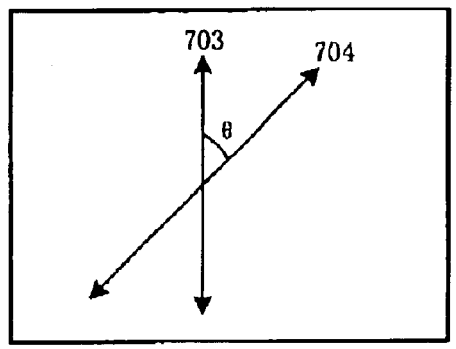
FIG. 7B shows the included angle between the optical axes of the quarter or the three-quarter waveplate and the single stage high birefringent waveplate according to the third embodiment of the depolarizer.

The last embodiment of the depolarizer is formed by a quarter waveplate or a three-quarter waveplate 701 and a high birefringent waveplate 702 as shown in FIG. 7A. The included angle between the optical axes (703,704) of the quarter or the three-quarter waveplate 701 and the single stage high birefringent waveplate 702 is set to 45°, as shown in FIG. 7B. The length d1 of the high birefringent waveplate according to the last embodiment of the depolarizer should also meet the equation (3). In the last embodiment of the depolarizer, θp is the included angle between the polarization orientation of the pumping light and the quarter waveplate or the three-quarter waveplate, as shown in FIG. 4B. And θ is the included angle between the optical axes of the two depolarizing waveplates, as shown in FIG. 7B.

From the equations 1, we know that the lengths of the waveplates are determined by the center wavelength of a laser's spectrum profile, the RMS spectrum width of the laser's spectrum and the material of the high birefringent waveplate. And in all embodiments of the depolarizer, the length of the high birefringent waveplate is relevant to the effect of depolarization.

Figure 8:
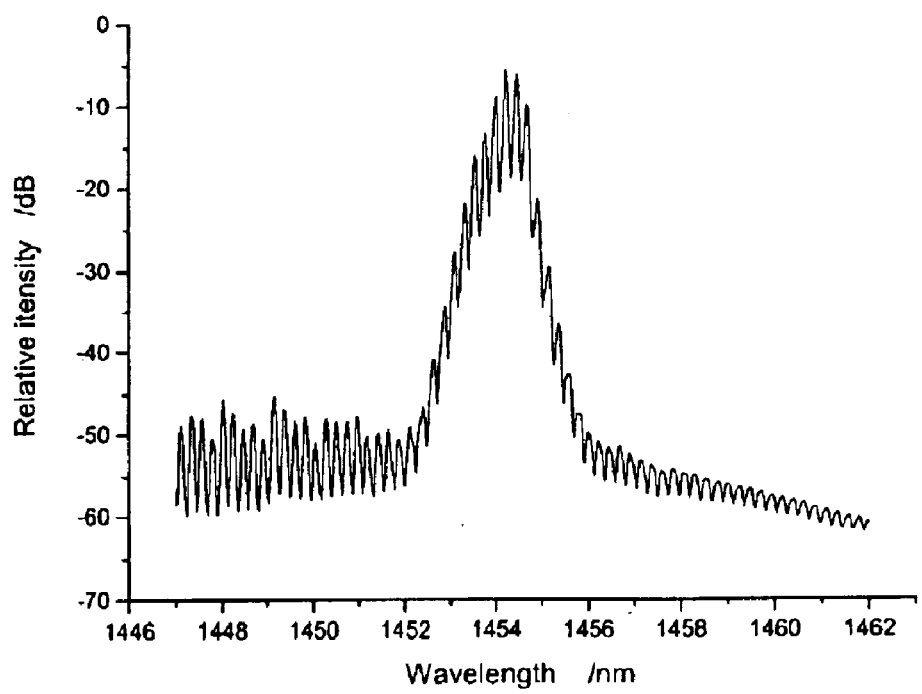
FIG. 8 shows a spectrum profile of a pumping laser diode whose forward current is 200 mA.
Figure 9:
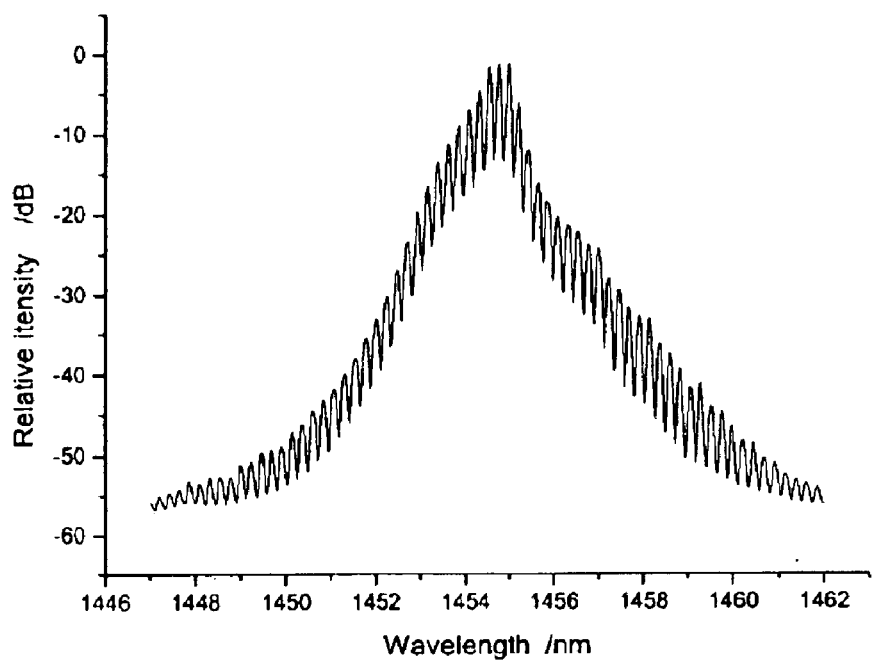
FIG. 9 shows another spectrum profile of the same pumping laser whose forward current is 800 mA.

As we know, the RMS spectrum width of a pumping laser varies under different forward current, as shown in FIG. 8 and FIG. 9. In FIG. 8, the RMS spectrum width is about 0.33 nm under 200 mA forward current. But in FIG. 9, the RMS spectrum width rises to 0.55 nm under 800 mA forward current. Moreover, multi-wavelength pump scheme is necessary for a Raman amplifier to flatten the gain profile. Usually, the center wavelengths of the pumping lights can range from 1415 nm to 1500 nm for amplification at C+L-band.

For example, allowing for the variation of the pumping laser's RMS spectrum width under different forward current, as shown in FIG. 8 and FIG. 9, in practice, the length d1 as shown in FIG. 5, FIG. 6A and FIG. 7A, should be 18 millimeters at least to lower the DOP of the pumping light to 5% or less when the center pump wavelength is 1455 nm and the high birefringent waveplate is made from YVO4 crystal. Likewise the center wavelength of the pumping light increases, the length of the high birefringent waveplate must increase in proportion. Therefore, the depolarizer should have a large dynamic range with respect to the RMS spectrum width and center wavelength of pumping lasers.

In the present invention, the output part is a single core collimator 104, which can collect and output the combined and depolarized pumping beam, as shown in FIG. 1.

Figure 10:
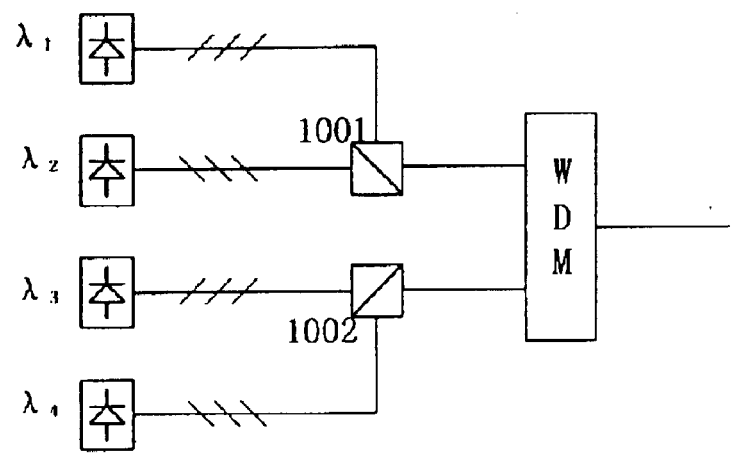
FIG. 10 illustrates an example of Raman amplifiers including two hybrid components according to the present invention.

FIG. 10 illustrates an example of Raman amplifiers including two hybrid components according to the present invention. As shown in FIG. 10, after combining and depolarizing four linear-polarized pumping lights from four laser diodes oscillating in four different wavelengths ($\lambda_1$, $\lambda_2$, $\lambda_3$ and $\lambda_4$), the two hybrid components (1001 and 1002) guide all of them to a WDM.

Of course, the hybrid component according to the invention can be used to depolarize a single input polarized light, but it is not the main application of the invention.

INDUSTRIAL APPLICABILITY

The hybrid component of the present invention can be used in distributed Raman amplifier, discrete Raman amplifier and other instances. It is suitable for pumping lights of different wavelengths and has compact size, low insertion loss and low cost. Therefore, the hybrid component and method according to the present invention is opening its way to extensive employment in optical communication systems and creating conditions for simpler, cheaper designs that should propel Raman amplifier market penetration.

It is to be understood that the above descriptions should not be construed as limitations on the scope of the invention, but rather as an exemplification of preferred embodiments thereof. Accordingly, the scope of the invention should be determined by the appended claims and their equivalents. Any variations or modifications within the spirit and scope of the invention should be covered by the appended claims.

What is claimed is:

1. A hybrid component for combining and depolarizing two pumping lights comprising:

input means including a dual polarization-maintaining core collimator with orthogonal slow axes means for inputting two polarized pumping lights into said hybrid component;

a polarization beam combiner including a Wellstone prism comprising two wedge prisms with orthogonal optical axes for combining said two polarized pumping lights to form a combined beam;

a depolarizer set next to and integrated with the polarization beam combiner to form said hybrid component so that the two pumping lights are combined and depolarized simultaneously; and an output means for collecting and outputting a single combined and depolarized pumping beam.

2. The hybrid component according to claim 1, wherein said two pumping lights are linear polarized, said output means includes a single core collimator.

3. The hybrid component according to claim 1, wherein said dual polarization-maintaining core collimator includes two polarization-maintaining fiber cores and the slow axes of the two polarization-maintaining fiber cores are orthogonal.

4. The hybrid component according to claim 2, wherein said depolarizer includes a single stage high birefringent waveplate.

5. The hybrid component according to 4, claim wherein the include angle between the second wedge prism of the polarization beam combiner and the single stage birefringent waveplate is set to 45° or close to 45°.

6. The hybrid component according to claim 2, wherein said depolarizer includes two high birefringent waveplates.

7. The hybrid component according to claim 6, wherein the included angle between the optical axes of the two depolarizing waveplates of said depolarizer is set to 45° or close to 45°.

8. The hybrid component according to claim 2, wherein said depolarizer includes one of a quarter waveplate and a three-quarter waveplate plus a single stage high birefringent waveplate.

9. The hybrid component according to claim 8, wherein the included angle between the optical axes of said one of the quarter waveplate and the three-quarter waveplate and the single stage high birefringent waveplate is set to 45° or close to 45°.

10. The hybrid component according to claim 1, wherein said depolarizer has a large dynamic range with respect to the RMS spectrum width and center wavelength of pumping lasers.

11. An optical amplifier including the hybrid component for combining and depolarizing pumping lights according to claim 1.

12. A method for combining and depolarizing pumping lights in an optical amplifier comprising the steps of:

inputting two polarized pumping lights with a dual polarization-maintaining core collimator with orthogonal slow axes;

providing a Wellstone prism comprising two wedge prisms with orthogonal optical axes to combin said two polarized pumping lights to form a combined beam;

providing a depolarizer next to and integrated with the polarization beam combiner to form a hybrid component so that the two pumping lights are combined and depolarized simultaneously; and collecting and outputting a single combined and depolarized pumping beam.

13. The method according to claim 12, wherein said two pumping lights are linear polarized.

14. The method according to claim 12, wherein said depolarizing performs depolarization in a large dynamic range with respect to the RMS spectrum width and center wavelength of pumping lasers.

15. The method according to claim 12, wherein said depolarizing step uses a single stage high birefringent waveplate and an included angle between the polarization of each of the two incident pumping lights and the optical axis of the single stage high birefringent waveplate is set to 45° or close to 45°.

16. The method according to claim 12, wherein said depolarizing step uses two high birefringent waveplates and an included angle between the optical axes of the two depolarizing waveplates of said depolarizer is set to 45° or close to 45°.

17. The method according to claim 12, wherein said depolarizing step uses one of a quarter waveplate and a three-quarter waveplate plus a single stage high birefringent waveplate and an included angle between the optical axis of said one of the quarter waveplate and the three-quarter waveplate and the single stage high birefringent waveplate is set to 45° or close to 45°.

18. The optical amplifier according to claim 11, wherein said two pumping lights are linear polarized, and said inputting means includes a dual polarization-maintaining core collimator with orthogonal slow axes, and said output means includes a single core collimator.

19. The optical amplifier according to claim 18, wherein said dual polarization-maintaining core collimator includes two polarization-maintaining fiber cores and the slow axes of the two polarization-maintaining fiber cores are orthogonal.

* * * * *